United States Patent [19]
Hirata

[11] Patent Number: 4,920,427
[45] Date of Patent: Apr. 24, 1990

[54] FACSIMILE APPARATUS

[75] Inventor: Yoshihiro Hirata, Koganei, Japan

[73] Assignee: Kabushiki Kaisha Toshiba, Kawasaki, Japan

[21] Appl. No.: 354,851

[22] Filed: May 22, 1989

Related U.S. Application Data

[60] Division of Ser. No. 240,440, Sep. 2, 1988, which is a continuation of Ser. No. 128,440, Dec. 3, 1987, abandoned, which is a division of Ser. No. 812,467, Dec. 23, 1985.

[30] Foreign Application Priority Data

Dec. 21, 1984 [JP] Japan ................................ 59-268400
Dec. 21, 1984 [JP] Japan ................................ 59-270463
Dec. 21, 1984 [JP] Japan ................................ 59-270468

[51] Int. Cl.$^5$ .............................................. H04N 1/00
[52] U.S. Cl. ...................................... 358/437; 358/444; 358/494; 358/296
[58] Field of Search ............... 358/437, 444, 494, 296, 358/434, 438, 439, 449

[56] References Cited

U.S. PATENT DOCUMENTS

4,631,596 12/1986 Yaguchi ............................ 358/449
4,712,139 12/1987 Kato ................................ 358/439

Primary Examiner—Edward L. Coles, Sr.
Attorney, Agent, or Firm—Finnegan, Henderson, Farabow, Garrett and Dunner

[57] ABSTRACT

A facsimile apparatus having a function for receiving and printing image information. Upon detection of printing trouble, received image information is maintained stored in an accumulator. Upon elimination of the printing trouble, the image information stored after the detection of the trouble is read out and printed.

4 Claims, 10 Drawing Sheets

| NOTICE OF PRIVATE MAIL DELIVERY | | | | |
|---|---|---|---|---|
| RECEIVED FROM | MAIL BOX # | ADDRESS | #PGS | TIME RECEIVED |
| 0425831111 | 03 ; | HARVEY | 06 | 09:30 |

FACSIMILE APPARATUS

This is a division of application Ser. No. 07/240,440, filed Sept. 2, 1988 which is a continuation of Ser. No. 07/128,440, filed Dec. 3, 1987, now abandoned, which, in turn is a division of Ser. No. 06/812,467, filed Dec. 23, 1985.

BACKGROUND OF THE INVENTION

1. Field of the Invention

This invention relates to an apparatus having dialing means performing a calling operation based on telephone number data, and more particularly an improvement in and relating to an apparatus such as a facsimile apparatus to print the administrative data and at least part of the picture image signals which have not been transmitted between a calling party and a called selected designation party in order to identify picture image signals which have not yet been transmitted.

2. Description of the Prior Art

Facsimile apparatus having a dialing performance are now used extensively. Among such facsimile apparatus is included a facsimile apparatus having abbreviated dialing functions. In such facsimile apparatus, the telephone number data of the facsimile apparatus of called parties or offices to which calling is frequently made is stored previously and the stored data are coverted into a read out selection signal (dial signal) by, for example, three key operations such as "#10". The selection signal thus formed is sent out to a telephone line (office line). This system enables calling without making a dialing operation corresponding to the telephone number of the facsimile apparatus of a called party by using a telephone set which uses telephone lines in common with the facsimile apparatus. Thus, it is advantageous that the number of mistaken telephone calls can be reduced, and the operation can be simplified. Even in a facsimile apparatus having an ordinary manual dialing function instead of the abbreviated dialing function, dialing operation can be made by a dial provided in the facsimile apparatus instead of using a separate telephone set. Thus, there is an advantage that the dialing operation can be made readily.

However, it is found that such facsimile apparatus as described above has the following disadvantages.

More particularly, most of the existing facsimile apparatus has simple transmitting and receiving functions in addition to additional functions such as a copying function. In such facsimile apparatus, interruption cannot be made for a central processing unit (CPU) that controls the overall operation to perform a different operation by additional function during transmitting and receiving operation. This is because during the operation as a copying machine, a recording unit and a read out unit are in operation so that when an operator wants to effect transmission and reception, the recording unit, the read out unit, a data bus, etc. are being used. Therefore, the CPU cannot permit transmission and reception operations. For this reason, an interruption for other operations is inhibited. In this case, even when the CPU is set in an automatic receiving mode, the telephone set and the telephone lines are connected to each other.

Figure 9:
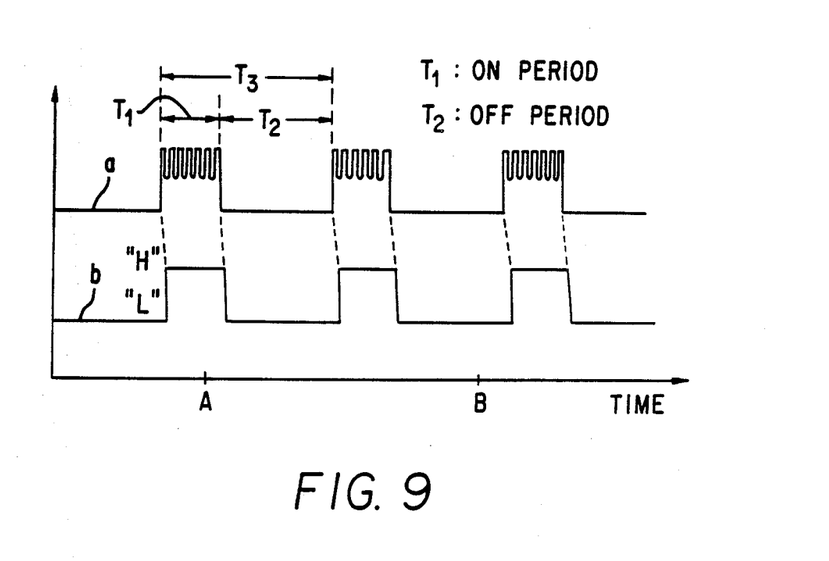
FIG. 9 shows the waveforms of a calling signal a and a paging detection signal b.

For this reason, when facsimile apparatus of a calling party receives a calling signal during the operation of an additional function, although the telephone set connected to the lines generates a call tone, since the CPU of the facsimile apparatus inhibits interruption based on a calling detection (calling signal detection), it is impossible to effect an operation in accordance with a calling detection until the operation by the additional function is complete. As shown in FIG. 9, the calling detection is made by detecting a call signal a which is an intermittent signal of a predetermined frequency sent out from a telephone exchange to the telephone lines, and each time a signal of the predetermined frequency is detected, a detection signal b is inputted to the CPU. Then, in response to this detection signal b, the CPU judges that there is a calling signal. In FIG. 9, $T_1$ represents a period in which the signal of the predetermined frequency appears (on period), $T_2$ a period in which the signal does not appear (off period), and $T_3$ a period in which the call signal a is repeated. When the operation of the additional function terminates at point A, as the detection signal b is inputted at that point (that is the H level), the CPU can effect calling detection but at point B since no detection signal is inputted (that is at a L level), calling detection is impossible. Consequently, when a calling request is made by an abbreviated dialing operation, regardless of the presence of the calling signal, the CPU will send out the selection signal after it has accessed the line. In other words, even though the state has changed to the receiving state, the calling operation will be made, thereby causing abnormal transmission and reception which results in decrease in the efficiency of using the lines, decrease in the efficiency at the line of repeated operations, and decrease in the reliability of the apparatus.

SUMMARY OF THE INVENTION

Accordingly, it is an object of this invention to provide an improved apparatus capable of improving the utilization efficiency of the office lines, reliability as well as operativeness of the apparatus by inhibiting at least the calling operation during an interval in which a call signal is interrupted so as to prevent "collision" of the receiving and calling operations.

According to this invention, there is provided an apparatus having a dial calling function comprising dial means performing calling operations to call an apparatus of a called party by sending out a selection signal corresponding to telephone number data to office lines, and inhibiting means for inhibiting the calling operation during a predetermined period after occurrence of a calling operation request from the dial means.

DESCRIPTION OF THE PREFERRED EMBODIMENT

Figure 1:
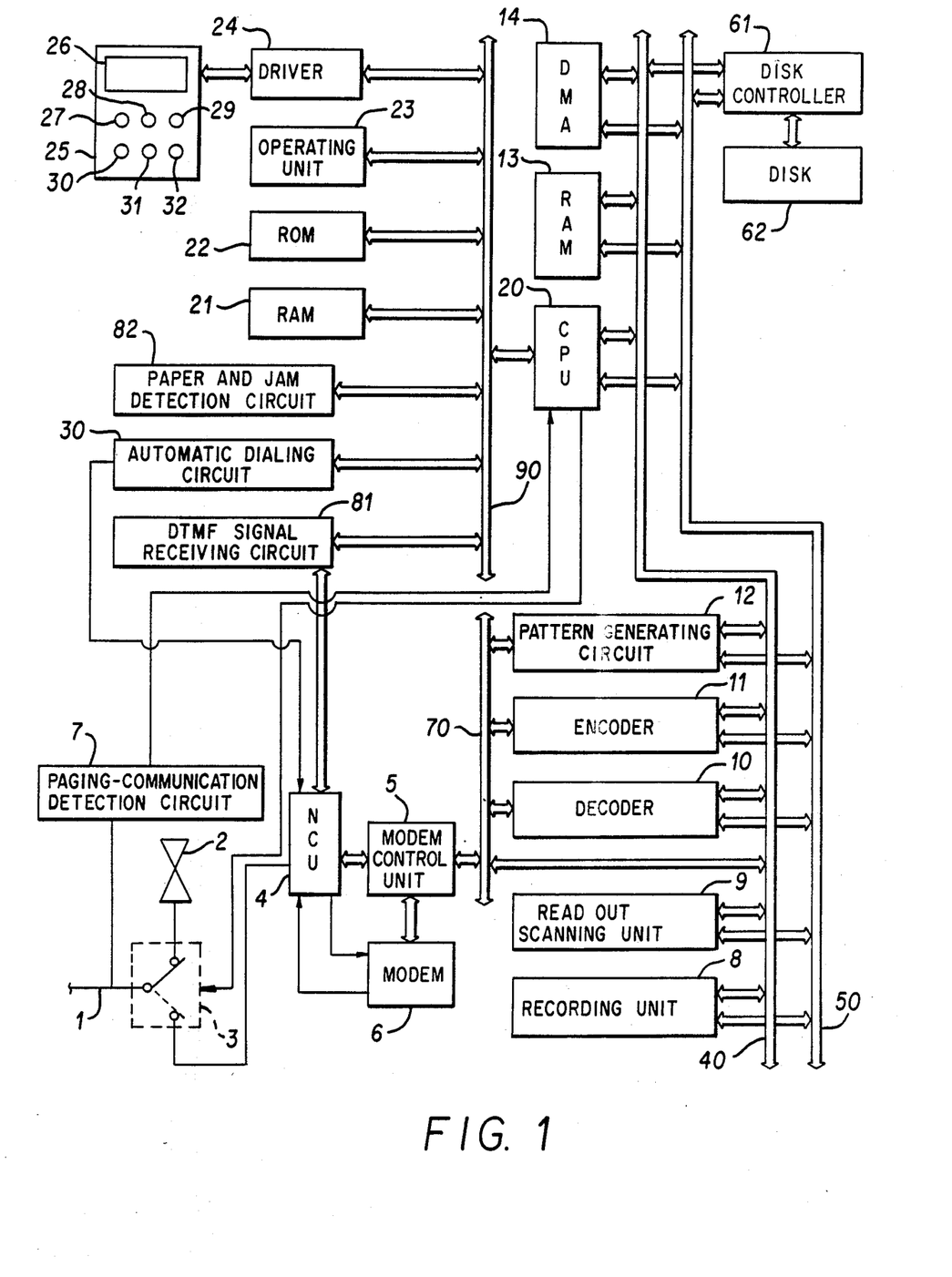
FIG. 1 is a block diagram showing and embodiment of the apparatus according to this invention.

A preferred embodiment of this invention shown in FIG. 1 comprises an office or telephone line 1 connected to a calling-talking signal detection circuit 7 that detects calling and talking operations. To the office line 1, telephone set 2 and a network control circuit (NCU) 4 is connected via a transfer switch 3. The NCU 4 has functions of starting and restoring a telephone exchange such as central office, etc. sending out a dial signal, detecting the call signal and holding a loop. A modem control unit 5 and a modem 6 are connected to NCU 4. The modem control unit 5 controls the modem 6 to effect a modulation and demodulation of a signal between a bus line 70 and NCU 4. The modem control unit 5 also acts as a path for exchanging data between NCU 4 and CPU 20. The modem 6 demodulates a signal outputted from NCU 4 and sends the demodulated signal to the bus line 70 via modem control unit 5. Further, the modem control unit 5 modulates a signal from bus line 70 and sends the modulated signal to NCU 4. Furthermore, NCU 4 is connected to a dual tone multi-frequency (DTMF) signal receiving circuit 81 which receives and decodes a DTMF signal sent from the office line 1.

A decoder 10, an encoder 11 and a pattern generating circuit 12 are connected to the bus line 70. The decoder 10 decodes and expands an encoded and compressed picture signal to convert the same into a picture signal that can be used for recording. The encodes 11 encode and compresses (for example, MR, $M^2R$, MH encoding) a picture signal that can be used for recording operation. The pattern generating circuit 12 generates a character pattern (picture signal) of a telegram sent back to the facsimile apparatus of the called party in accordance with a character code given by the CPU 20. The bus line 70 is connected to bus lines 40 and 50. The bus line 40 can pass a control data and a picture signal. The bus line 50 passes only the picture signal and the bus line 40 passes only the control data to a CPU 20. The CPU 20 controls recording unit 8, read out scanning unit 9, decoder 10, encoder 11, pattern generating circuit 12, RAM 13, DMA 14, disk controller 61 which are connected to the bus lines 40 and 50 as well as the modem control unit 5, and NCU 4 which are connected to the bus line 70. The recording unit 8 produces a recording output by receiving a picture signal that can be used for recording and is provided with a buffer memory device for temporarily storing the picture signal. The read out scanning unit 9 photoelectrically converts a received picture image into a picture signal which can be used for recording after eliminating noise and converting into binary data. The RAM 13 has a relatively large capacity and is used to store picture signals that can be used for recording. The DAM 14 transfers the picture signal under control of CPU 20. A disk 62 is connected to a disk controller 61 which is connected to the bus line 50. The disk controller 61 controls the disk 62 such that it stores the picture signal and that the picture signal is read out of the disk 62.

Further, CPU 20 is connected to the bus line 90 which in turn is connected to RAM21, ROM22, an operating unit 23, a driver 24, an automatic dialing circuit 30, the DTMF signal receiving circuit 81, an absence of paper and paper jam detection circuit 82. The RAM21 is used as a working memory device of CPU 20, and ROM22 stores programs utilized in CPU 20. The automatic dialing circuit 30 controls NCU 4 in accordance with preregistered dial number data, thereby effecting a calling operation. The operating unit 23 comprises a ten key or the like in addition to such various function keys as a transmission key, a reset key or the like and is used by an operator for inputting necessary data. A display unit 25 is connected to driver 24 which displays desired characters by LCD26 of the display member 25 under the control of CPU 20. The driver 24 controls lighting and extinguishing of LEDs 28–32. The DTMF signal receiving circuit 81 sends to CPU 20 data based on a DTMF signal received through NCU 4. The absence of paper and paper jam detection circuit 82 is connected to a sensor, not shown, and in response to a signal produced by the sensor, the absence of paper and paper jam detection circuit 82 sends a detected data to CPU 20. In addition to these data, the CPU 20 is supplied with a calling detection signal from the calling-talking signal detection circuit 7 based on the detection of a calling signal and an off-hook detection signal in accordance with a detection of a DC loop including the office line.

The facsimile apparatus having a construction described above can execute a multiple address communication, a mail box communication, relayed multiple address communication, substitute receiving communication and a multicopy communication in addition to an ordinary communication with the facsimile apparatus of a called party. The term multiple address communication means a sequential transmission of the same picture signal to a plurality of called parties. The term mail box communication means a system in which a box for storing a received picture signal is provided and, when requested, to store a desired number in the box by the facsimile apparatus of the called party and when a predetermined operation input is received from the owner of the box, the box outputs a recording output based on the picture signal. The term substitute receiving communication means a communication wherein when troubles such as paper jamming and paper absence occur while a recording printing is being carried out immediately after receiving a picture signal, the picture signals after occurrence of the troubles are stored and after disappearance of the troubles, the printing based on the picture signal stored in a memory device can be carried out. Furthermore, the term relayed multiple address communication means sequentially sending of a received picture signal to parties requested by the calling party. In the relayed multiple address communication, there is a case in which a relaying office is designated as a party to be called. The term multicopy communication means a communication in which printing is carried out according to the number indicated in the received picture signal, which is requested by the calling party. The term single memory transmission means a communication wherein when transmitting the picture signal to only one called party, the picture signal is stored in disk 62 and the stored picture signal is automatically transmitted to the called party at a preset time. Accordingly, this communication is similar to the multiple address communication.

During the communications of the type described above other than the multiple address communication, and the substitute receiving communication, the called facsimile apparatus sends to a calling party information showing the type of communication and other necessary information.

Figure 2A:
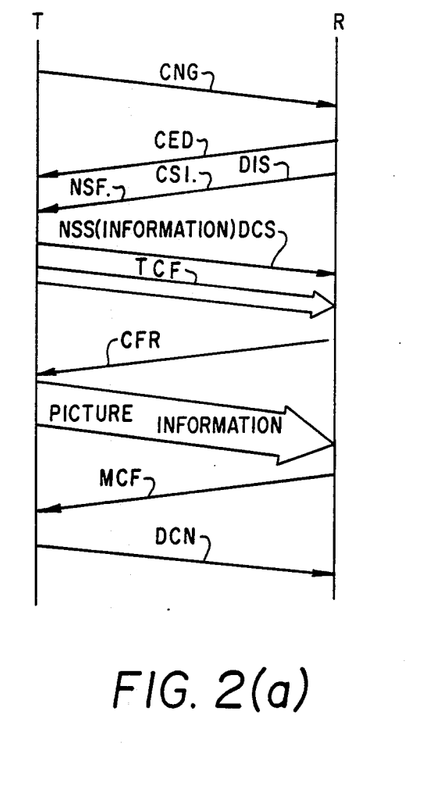
FIGS. 2a and 2b are charts showing a communication sequence utilizing the apparatus shown in FIG. 1.

In one method, as shown in FIG. 2a the information is included in an NSS signal (non-standard facilities setup) sent from the facsimile apparatus (transmitter T) of the called party. In the case of the relayed multiple address communication, the information necessary for this method is the box number data, and in the case of the multicopy communication, a copy number is sent. In any type of communication, called party data indicated of parties to be called are sent. However, this called party data may be ignored.

Figure 2B:
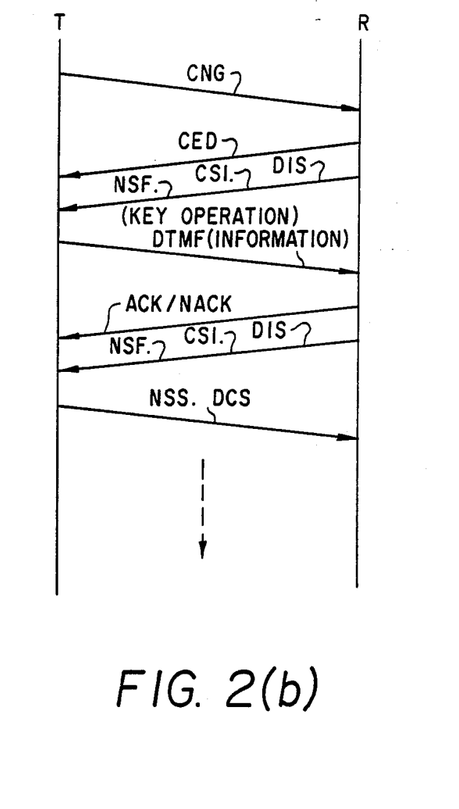

In another method as shown in FIG. 2(b), the called party facsimile apparatus is caused to send the information in accordance with the DTMF signal. In other words, since the facsimile apparatus acts as a receiver R, it sends out a CED (called station identification) signal; a NSE (non-standard facility) signal, a CSI (called subscriber identification) signal and a DIS signal (digital identification signal). In response to these signals, an operator of the transmitter T operates a dial key of the telephone set so as to send a desired DTMF signal. For example, it is predetermined that ⌈#⌋⌈1⌋ represents the mail box, ⌈*⌋⌈1⌋ represents the relayed multiple address communication and that ⌈#⌋⌈2⌋ represents the multicopy communication. Then, the third and following digits enable to transmit a necessary information with digit keys. The termination is predetermined as ⌈*⌋. This DTMF signal is received by the DTMF signal receiving circuit 81 via NCU 4, while decode data based on the DTMF signal is supplied to CPU 20. Then the CPU 20 sends back an ACK1 acknowledge signal via NCU 4. However, when not supplied with the decode data, the CPU 20 sends back an NACK (nonacknowledge) signal. Here, it is assumed that ACK comprises a continuous tone of a predetermined frequency, and that the NACK comprises an intermittent tone of a predetermined frequency. In response to these tones, the operation can confirm whether data has received or not. Then, the receiver R sends out of NSF signal, CSI signal and DIS signal. When the connection is transferred from the telephone set to the facsimile apparatus on the side of transmitter R, the transmitter T sends out the NSS signal and the DCS signal, and thereafter the signals are transmitted and received according to the same transmission control procedure as that shown in FIG. 2a.

Figure 3A:
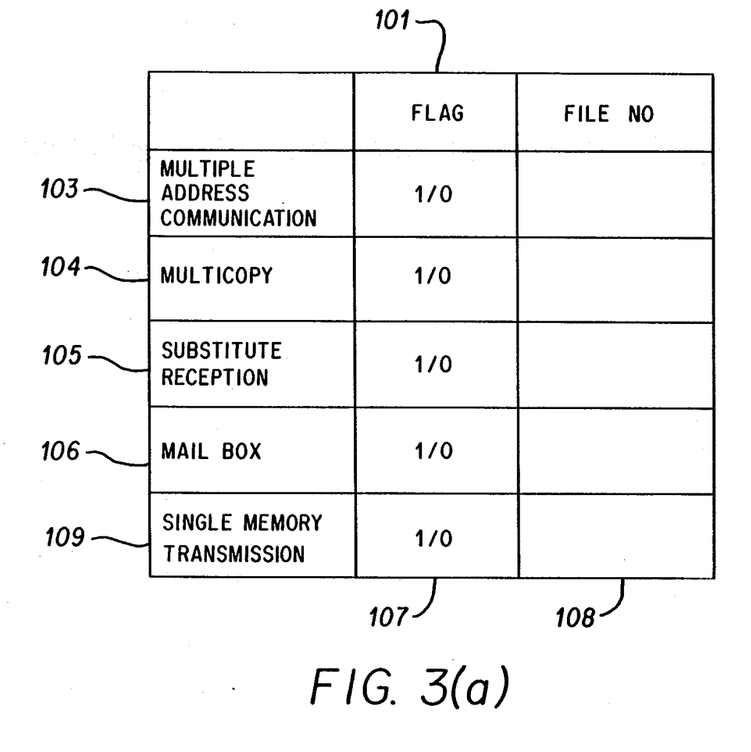
FIGS. 3a–b are diagrammatic representations showing the relation between an administration table and files.
Figure 3B:
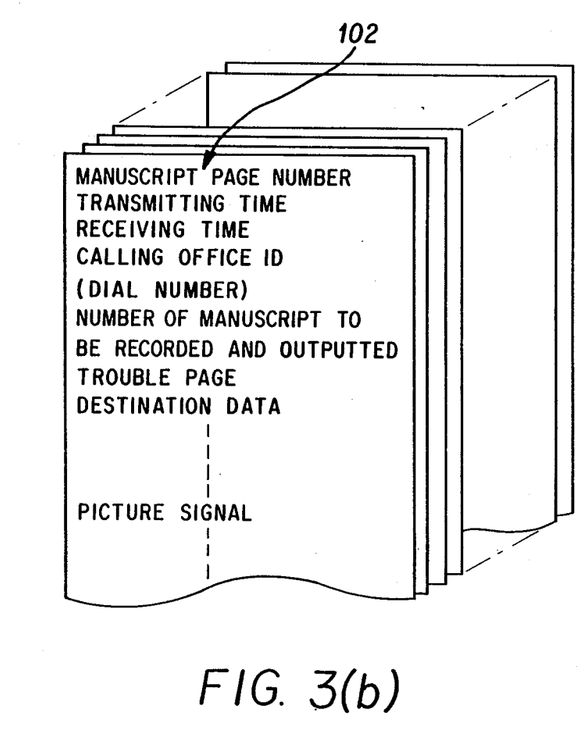

FIG. 3 shows the relationship between the administration table utilized for supervising the data in RAM 13 or disk 62, and the file. The administration table 101 is contained in RAM21, while file 102 is contained in RAM 13 or disk 62. The administration table 101 is partitioned by code data 103 representing the multiple address communication, code data 104 representing the multicopy communication, code data 105 representing the substitute receiving communication, code data 106 representing the mail box communication, and code data 109 representing the single memory transmission. The single memory transmission and the multiple address transmission may be combined into the same code data. A flag column 107 is provided representing whether the processing is necessary or not. Further, a file No. data column (in the case of the mail box communication, the box No. data is stored) is provided for storing the file No. data of the file to be processed. When RAM 13 or disk 62 is accessed by utilizing the file No. data as an address signal, a corresponding file can be read out.

At the head of the file 102, there are page number (number of manuscripts), an interval to be transmitted, an interval in which reception is made, calling station ID (dial number), the number of pages to be recorded and outputted, a troubled page, a destination data, etc., and the picture signal is stored in a section next to the head. When various communications including input for the multiple address communication, relayed multiple address communication, multicopy communication, a substitute reception communication, and mail box communication are made, a flag of a corresponding flag column 107 is set while at the same time, a picture signal, etc. are stored in an idle file for writing the file No. data of this file in a corresponding file No. data column 108. The CPU 20 scans the flag column 107 with a predetermined period, to read out a corresponding file No. data when the flag is set thereby accessing the file 102 based on the read out data. At the time of the multicopy communication, the CPU 20 immediately starts printing, at the time of the single memory communication, the communication starts at a designated time, while at the time of the multiple address communication (including the relayed simultaneous communication), the CPU 20 commences the communication at a designated time, if any, but where there is no time designation, it immediately commences communication at that time. At the time of the substitute receiving communication and the mail box communication, the CPU 20 starts printing if a predetermined operation has been made. The areas of RAM other than the supervisory table are used as a register or a flag.

Let us now describe in detail the operation of the CPU 20 with reference to the flow charts shown in FIGS. 4-7. The programs of these flow charts are stored in RAM 22.

Receiving Operation

Figure 4A:
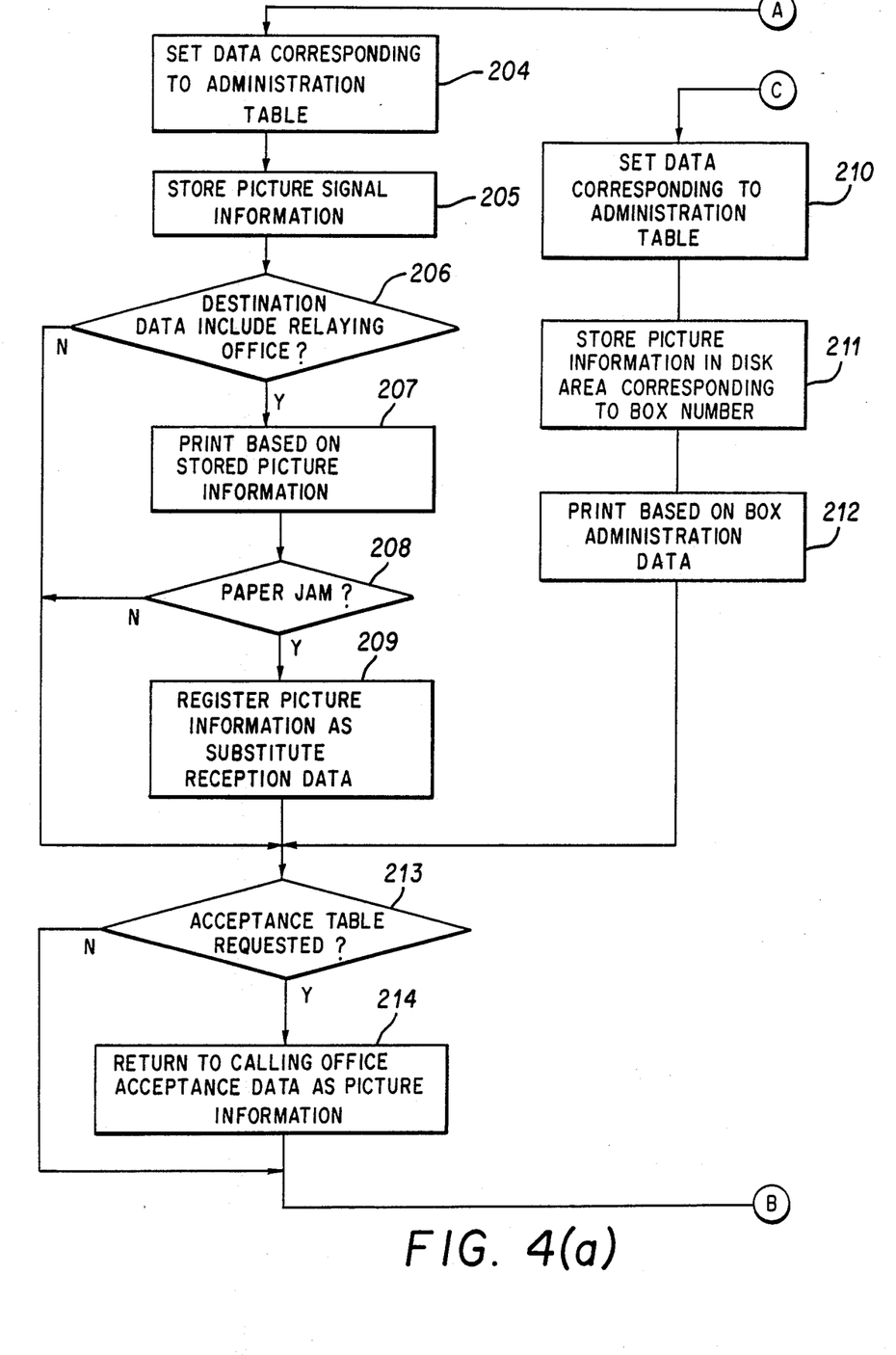
FIGS. 4a–b are flow charts showing the receiving operation of the apparatus shown in FIG. 1.
Figure 4B:
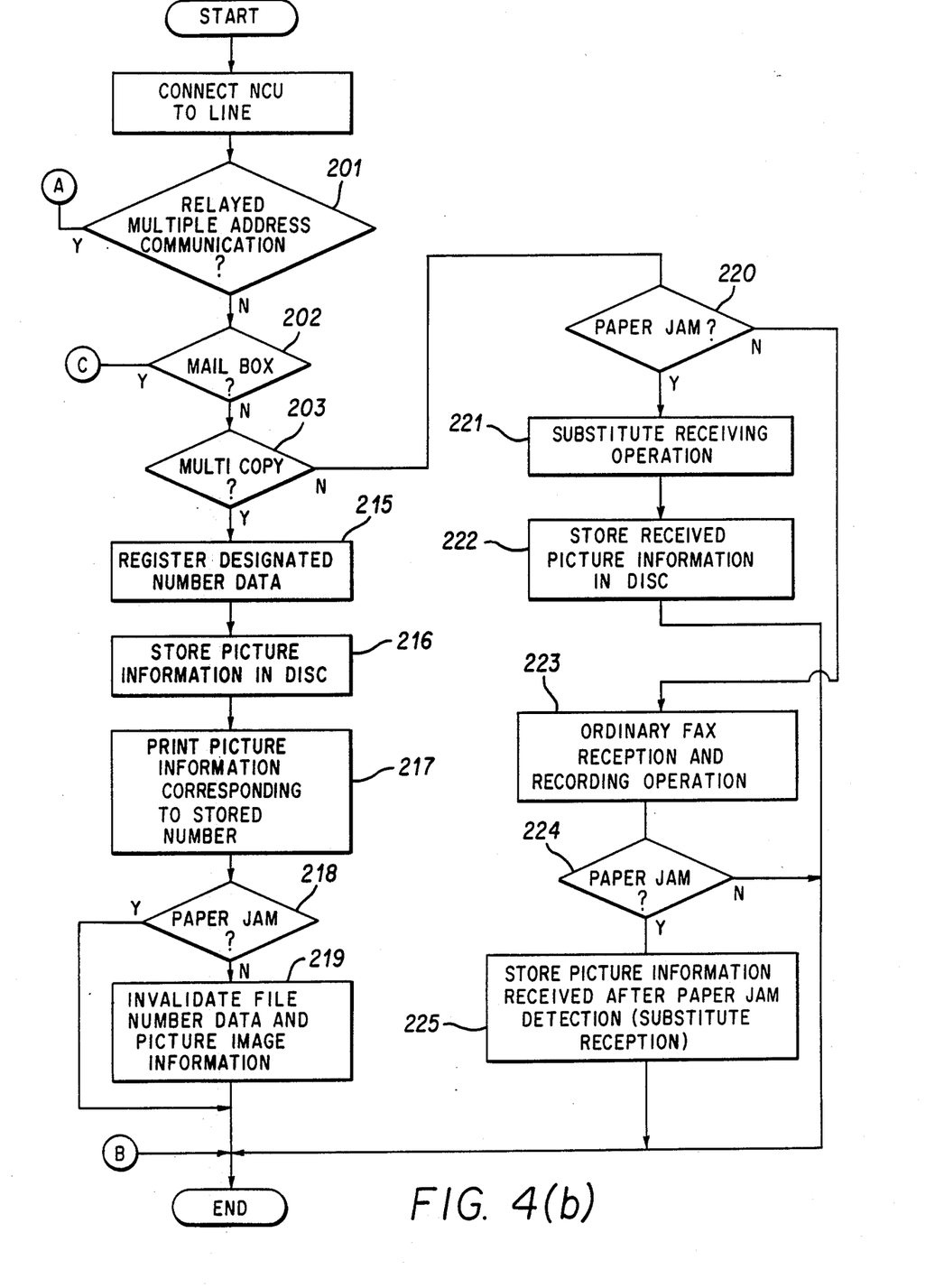

The flow chart shown in FIG. 4 shows the receiving operation. As already has been described in connection with FIG. 2, the CPU 20 is supplied with information representing the type of communication and necessary information by an NSS signal from the facsimile apparatus of the called party or by a DTMF signal. Then, at steps 201, 202 and 203, judgments are made whether the communication is relayed multiple address communication, mail box communication or multicopy communication by referring to the information representing the type of the communications described above. If the communication is the relayed multiple address communication, at step 204, a flag in an administration table 101 corresponding to the code data of the relayed multiple address communication is set, and at step 209, a file No. data for storing the picture signal is written. Then at step 205, the called party data and calling party ID are stored in a file corresponding to the file No. data, and the DMA 14 transfers the picture signal. Where a transmission time data is inputted, this data is also stored in the CPU. More particularly, except for the reception of the picture signal, control signals from modem control unit and NCU 4 are transmitted and received via bus lines 40, 50 and 70 for storing necessary information in the file. (If necessary, a route through the DTMF receiving circuit 81 and the bus line 90 can be used). When the picture signal is received, the decoder 10 and DMA 14 are started. Then, necessary data are transferred to DMA 14 for transferring the monopoly of the bus lines 40, 50 and 70 to DAM 14, whereby DAM 14 stores a picture signal decoded and expanded by decoder 10 in the file.

At step 206, a check is made as to whether or not destination data which provides the addresses of parties to be called in the information obtained by either one of the procedures described in connection with FIG. 2 contains the relaying party which relays communication from the calling party. When the result of check is YES, at step 207, a control is made to perform printing based on the picture image signal in the file. In this case, the control is transferred in DMA14, whereby it transfers the picture image signal between RAM 13 or disk 62 and the recording unit 8 which performs printing based on the picture signal. Meanwhile, at step 208, in accordance with detection data sent from the absence of paper and paper jam detection circuit 82, a check is made as to whether there is paper absence and paper jam or not. If there is paper absence and paper jam, at step 209, a flag corresponding to the code data of the substitution receiving communication stored in the administration table 101 is set, and at step 209, the file No. data of a file in which the picture signal related to the recording output is recorded is registered in the corresponding file No. data column.

Figure 8:
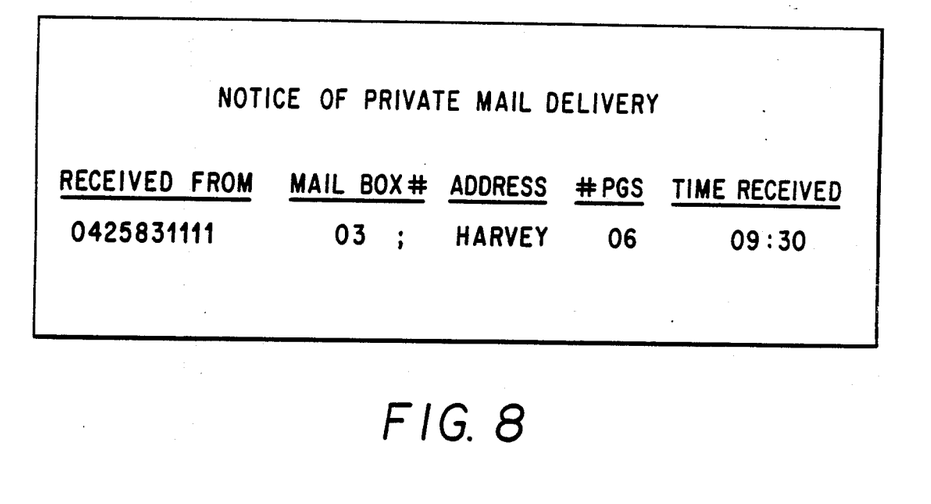
FIG. 8 shows one example of a recording table at the time of mail box communications.

In the case of the mail box communication, at step 201, a flag of the administration table 101 corresponding to the code data of the mail box communication for writing the received box No. data (file No. data) in the file No. data column. Then, at step 211, information regarding a file sending office ID corresponding to the file No. data and the called party are stored, and DMA14 transfers the picture signal. Then, necessary information is read out from the head of the file and sent to the pattern generating circuit 12 for generating a character pattern (picture signal) which is sent to the recording unit 8. Based on this character pattern (picture signal), the recording unit 8 performs printing. FIG. 8 shows a recording table 501 printed out. On the recording table 501 are printed a calling office data, a mail box number, an address, number of total pages, and the receiving time starting from the lefthand side. This recording table is dispatched to called parties.

At the time of communicating between the relayed multiple address communication and the mail box communication, at step 213, a check is made as to whether an information sent from the facsimile apparatus of the called party contains data representing a request of an acceptance table or not. When the result of check is YES, at the time of completing the receiving operation, a control signal representing transmission of a picture is sent out through the modem control unit 5 and NCU 4 by effecting an inversion poling. After that, the program is advanced to a transmission control procedure for sending a picture signal from the facsimile apparatus. Then, character data representing states of acceptance (for example, all page reception, reception up to the second page) is sent to the pattern generating circuit 12 in accordance with a predetermined format. The character pattern (picture signal) generated by the pattern generating circuit is sent to the encoder 11. Then, at step 214, a picture signal encoded and compressed by the encoder 11 and representing acceptance state is sent back through the modem control unit 5, the modem 6 and the NCU 4, whereby the calling office which has performed relayed multiple address communication and mail box communication can grasp at a glance the state of acceptance of the message.

At the time of the multicopy communication, at step 215, a flag is set in administration table 101 corresponding to the code data of multicopy, and file No. data is written in the file No. data column adapted to store the received picture image signal. Then, at step 216, information regarding a calling office identification code (ID) and the number of copies are stored in a file corresponding to the file No. data. After that, at step 217, the data corresponding to the number of copies and stored at the head of the file 102 are recorded. In other words, the copy number data is stored in the register of RAM21 DMA 14 is started for effecting a control similar to that executed at step 207. However, each time a picture signal has been transferred, the CPU 20 is supplied with termination data from DMA14 for decrementing by 1, the data stored in the register. This operation is continued until the data is reduced to zero. Meanwhile, at step 218, a check is made as to whether there is a paper absence and paper jam state or not in the same manner as at step 208. In this manner, upon completion of the printing operation corresponding to the copy number data stored in the file without the trouble of absence of paper and paper jam, at step 210, a flag corresponding to the code data of the multicopy data stored in the file 102 is set for invalidating a corresponding file No. data and the picture signal, whereby the file of the invalidated file becomes idle, that is usable thereafter.

When the communication is not either one of the relayed multiple address communication, mail box communication and multicopy communication, the communication is a normal facsimile communication. In this case, at step 220, a check is made as to whether there is a paper absence and paper jam state. When there is a paper absence and paper jam state, at step 221, the substitute receiving operation is executed as has been described in connection with step 209. Thus, at step 222, no recording output is produced, and the received picture signal is stored in a prescribed file, and a necessary administration file is prepared. Further, when it is judged that there is no paper absence and paper jam state of step 220, at step 223, a normal facsimile receiving operation is started. For example, under the control of CPU 20, a picture signal outputted from the encoder 10 of DMA14 is transferred directly to the buffer memory device in the recording unit 8 which in response to this picture signal performs printing. Meanwhile, at step 224, a check is made as to whether there is a paper absence and a paper jam state in the same manner as at step 208. When there is a paper absence and paper jam state, at step 225, the substitute receiving operation of step 221 is executed.

While the receiving operation is being made, there is a case in which the following printing operation may be performed. Thus, while the relayed multiple address communication, the mail box communication and multicopy communication are being made, where a paper absence and paper jam state is detected, light emitting diodes (LEDs) 27-32 will be lighted respectively corresponding to these states.

Printing Operation

Figure 5A:
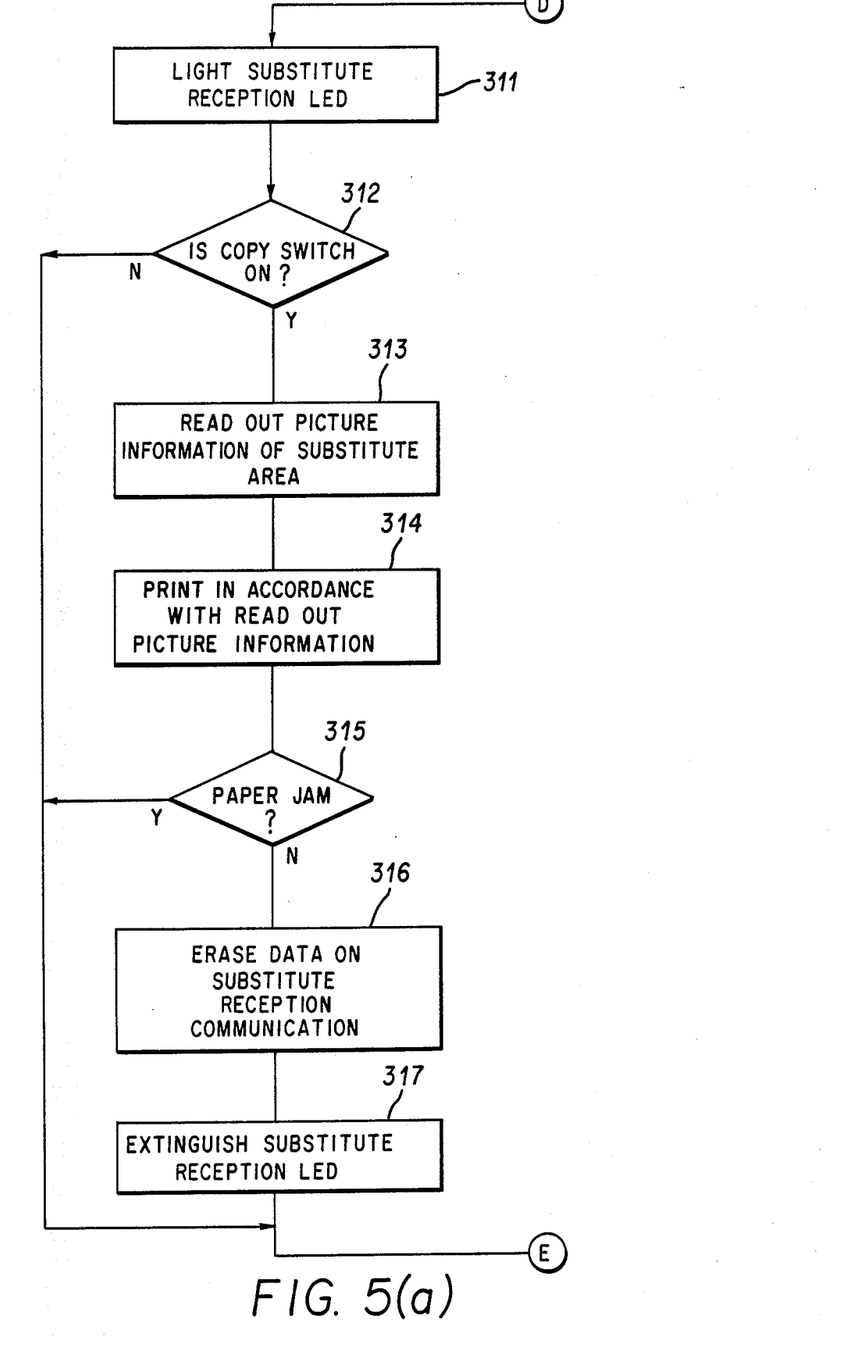
FIGS. 5a–b are flow charts showing the record output operation of the apparatus shown in FIG. 1.
Figure 5B:
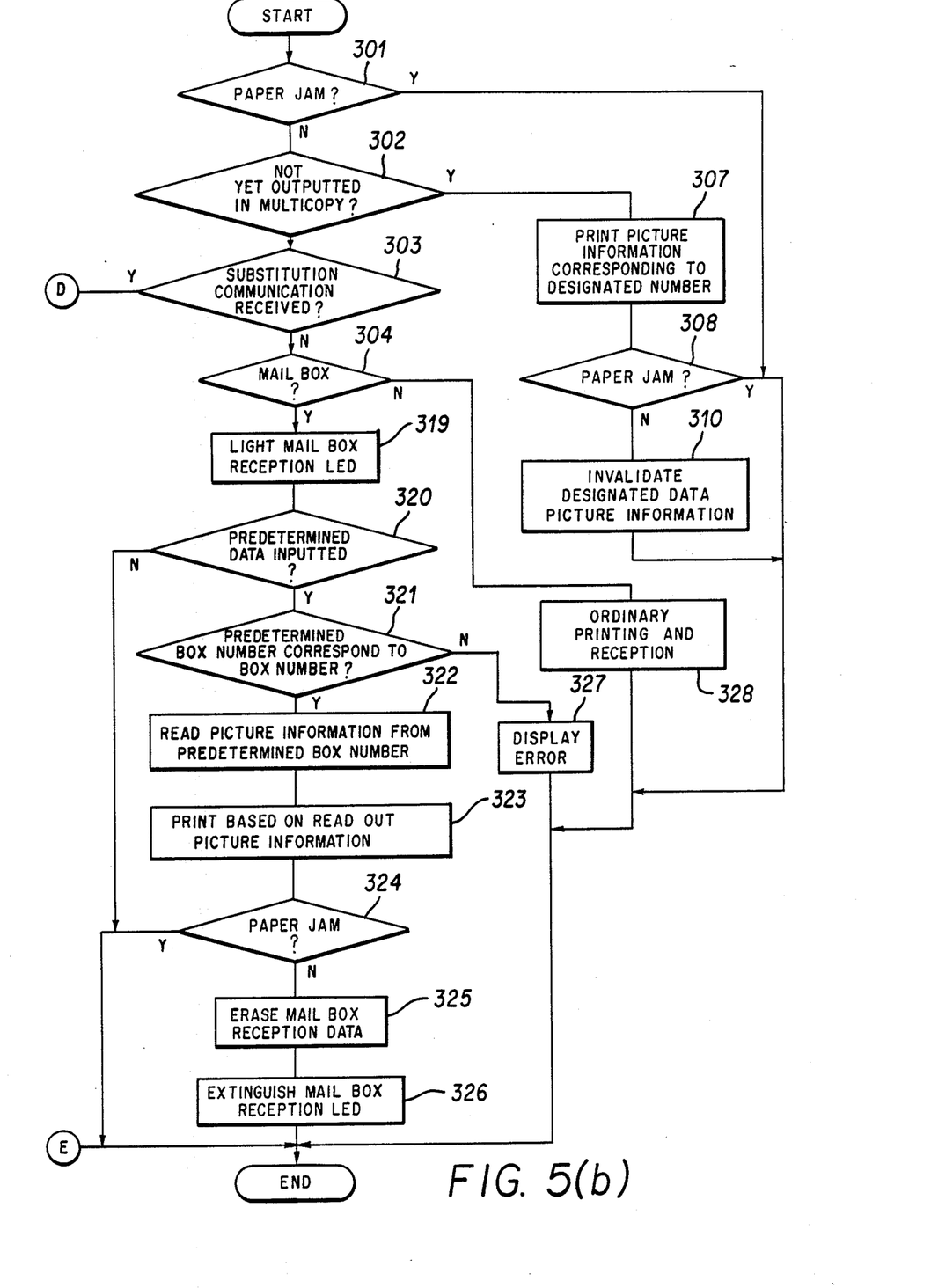

FIG. 5 shows a flow chart at the time of printing. The CPU 20 executes the program of this flow chart not only at the time of receiving but also even after termination of receiving.

At steps 301-304, judgments are made as to whether there is a paper absence and paper jam state, whether printing has not been performed at the time of the multicopy communication, and whether there is a substituted reception or a multibox communication. When the paper absence and paper jam state is detected, the CPU 20 controls the driver 24 for lighting LEDs indicating this state of the display unit 25 for waiting the operation of the operator. Where printing has not been performed at the time of the multicopy communication, at step 307, corresponding LEDs are lighted for printing out in the same manner as at step 217. Since the contents of steps 308 and 310 are similar to those of steps 218 and 219 shown in FIG. 4, their description is omitted. Upon detection of the paper absence and paper jam state, corresponding LEDs are lighted. Then at the time of the invalidation processing of the picture information or the like executed at step 210, LEDs representing the multicopy communication are extinguished.

At the time of the substitution receiving communication, at step 311, the corresponding LEDs are lighted and at step 312, a check is made as to whether the copy switch is ON or not. More particularly, the input of the operating data of a switch provided for the operating unit 23 is scanned for detecting the ON state of the copy switch. When the copy switch is not ON, the program is stopped until the switch is closed because the substitute receiving communication is made in the paper absence and paper jam state. For this reason, when printing operation is commenced without the intervention of the operator, the printing will be performed when the paper absence and paper jam state is not removed, whereby the paper absence and paper jam state will appear again.

When the copy switch is ON, at step 313, the administration table 101 is searched and in accordance with the file No. data in which the picture image received by the substitute receiving communication, the picture image is read out of the file, and at step 314, printing is performed based on this picture signal. The operation of CPU 20 has already been described. Meanwhile, a check is made as to whether there is a paper absence and paper jam state or not. When there is no paper absence and paper jam state and the printing based on all picture signals have been performed, at step 316, a flag of the administration table regarding the substitution receiving communication is reset and respective data are invalidated to extinguish LEDs representing the substitute receiving communication at step 317. When there occurs a paper absence and paper jam state while printing being performed in accordance with the picture signal received under the substitute receiving condition, LEDs representing this state are lighted at step 318.

In the case of the mail box communication, at step 319, LEDs representing this state are lighted. Then, at step 320, the CPU 20 waits for the inputting of predetermined data which means the key input of a specific number from the operating unit 23 and the data produced by the insertion of the magnetic card in a facsimile apparatus in which a magnetic card can be read. When there is a predetermined data input, at step 321, a check is made as to whether the predetermined data and the box No. data in the mail box communication coincide with each other or not. Upon coincidence, at step 322, corresponding box No. data and a picture signal of a corresponding file are read out and these signals are transferred to the recording unit 8 by DMA 14, and at step 323, printing based on the picture signal is performed. Meanwhile, at step 324, a check is made as to whether there is a paper absence and paper jam state. When there is no paper absence and paper jam state and printing all picture image signals in the mail box communication is completed, at step 325, a corresponding flag of the administration table regarding the mail box communication is reset and the data are invalidated, so as to extinguish LEDs representing the received of the message of the mail box communication are extinguished at step 326. Where a paper absence and paper jam state is detected during printing operation based on picture signal received in the mail box communication, LEDs representing this state are lighted. In a case shown in step 321 in which the predetermined data has been inputted but it does not coincide with the box No., at step 327, the driver 24 is controlled to cause the display unit 25 to display that there is an input error to LCD26. When there is no paper absence and paper jam state and the communication is not either one of the specific communications executed at steps 302-304, ordinary receiving and printing are executed at step 328. This printing operation is identical to those executed at steps 223, 224 and 225 shown in FIG. 4.

Transmission Operation

Figure 6:
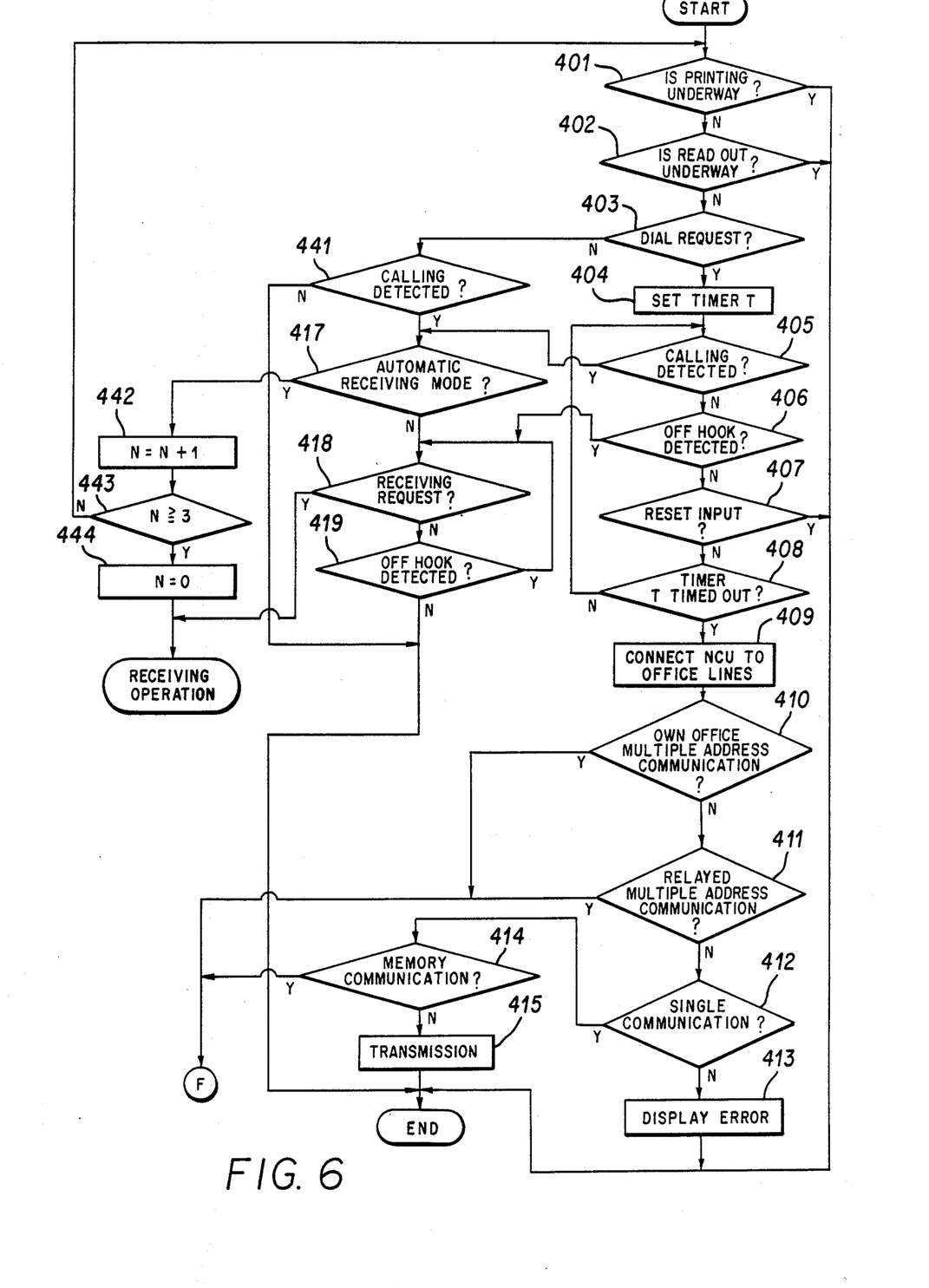
FIGS. 6 and 7 are flow charts showing the transmitting operation of the apparatus shown in FIG. 1.
Figure 7:
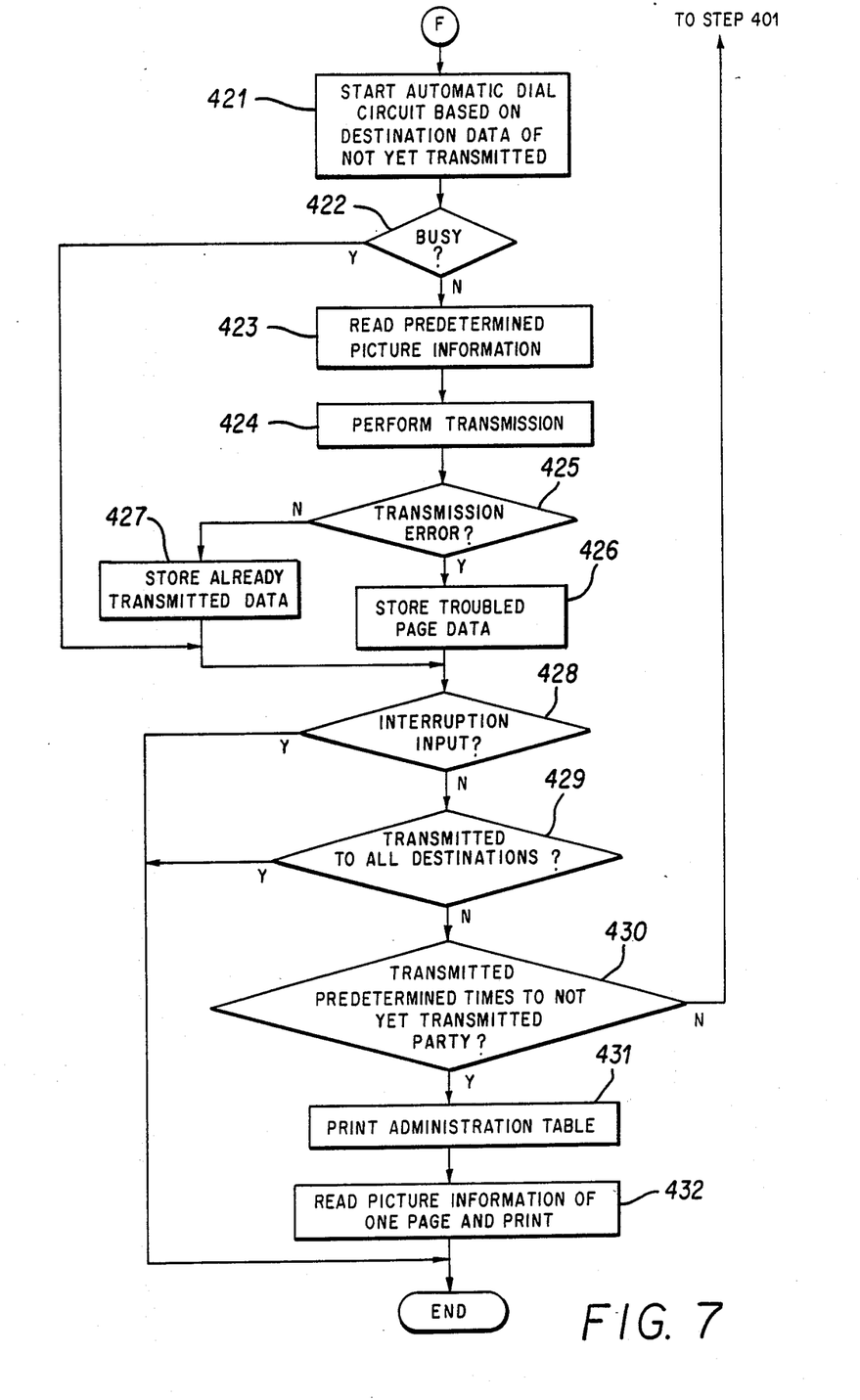

The flow charts shown in FIGS. 6 and 7 show the transmission operation. At step 401 and 402, checks are made as to whether printing is performed by the recording unit 8 (whether the operation shown in FIG. 5 is being executed or not) and whether the reading is made by the read scanning unit 9. Where it is confirmed that such operations are made, the transmission operation is inhibited until such operations are completed. Upon completion of these operations, at step 403, a check is made as to whether there is a calling request caused by a key operation of the operating unit or whether there is a calling request (dial request) based on the designated lines data previously registered and the destination data. When it is judged that there is a calling request, timer T is set to count an off period $T_2$, at step 405, the calling is detected according to the detection of the calling signal b sent from the calling signal detection circuit 7 before elapse of the off period $T_2$, at step 406, OFF hook is detected by the detection of the OFF detection signal, and at step 407 a reset detection is executed by the detection of the reset key operation input from the operating unit 23. Then, at step 408, when it is judged that there is no calling, no OFF hook and no reset input during the off period $T_2$, a calling operation due to a dial request is permitted. When a calling is detected during the off period $T_2$ at step 405, at step 417, a judgment is made as to whether the program is set to the automatic receiving mode or not. If the judgment is YES, at step 442, the content N of the calling number register, not shown, is incremented by 1. Then, at step 443, a judgment is made as to whether the content N of the calling number register is equal to 3 or larger or not. When N is equal to 3 or larger, that is, where equal to or more than 3 callings are detected, at step 444, the content of the calling number register is reset to zero and then the program is transferred to the receiving operation described above.

Where the content N of the calling number register does not satisfy a relation $N \geq 3$, the program is returned to step 401. At step 417, when it is judged that the operating mode is not set to the automatic receiving mode, at steps 417-419, the receiving request due to receiving key operation of the operating unit 23 is detected while the OFF hook is being detected (until the talking completes) so as to judge the presence of a receiving request. Then, the program is transferred to the receiving operation, whereas where there is no receiving request, the program is returned to the initial state. At step 406, when it is judged that there is an OFF hook, at step 418, the receiving request is detected while OFF hook is being detected in the same manner as described hereinbefore. At step 407, when it is judged that there is a reset input, the program is returned to the initial state. It should be understood that off period $T_2$ is the same as the call signal off period $T_2$ shown in FIG. 9. When there is no dial request at step 403, at step 441, a calling is detected by detecting the call signal b, and then the program is transferred to step 417.

At steps 404-408, when the calling operation is permitted as a result of a dial request, at step 409, NCU 4 and the line 1 are connected, and at steps 410-412, judgments are made as to whether the calling is made by either one of the multiple address communication due to an input to a calling office and a transmission request for a signal destination office in accordance with an operation input data and the data in the administration table and file, and at step 413, error is displayed by LCD 26 when there is no calling operation and data in the administration table and file, thus returning to the original state. When, at steps 410 and 411, it is judged that the communication is the multiple communication, the processing at step 421 is executed. Furthermore, when it is judged that the transmission is made to a single destination at step 412, it is judged as to whether or not the transmission is made for sending a picture signal stored in the disk 62. When the result of judgment is YES, the program is advanced to step 421 in the same manner as above described. When it is judged that the picture image is not transmitted, at steps 414 and 415, the read scanning unit 9 obtains a picture signal of a line unit by the read scanning unit 9 during normal transmission operation, that is, while sequentially conveying manuscript mounted on a transmission stacker. Then, after encoding and modulation, the picture image is sent out to the line 1.

When the results of judgments executed at steps 410, 411 and 414 as to whether the communication is multiple address communication and whether it is memory transmission are YES, at step 421, one destination data is read out from the head portion of the file based on a corresponding file No. data, which is supplied to the automatic dialing circuit 30 to cause it to send out a dial signal. Then, at step 422, a check is made as to whether the line is busy or not in accordance with the arrival of a busy tone via the modem control unit 5 and NCU 4 for waiting a response from the called facsimile apparatus. At steps 423 and 424, when there is a response, the control signal is transmitted and received through the model control unit 5 and NCU 4 according to the transmission and receiving procedure, the RAM14 is started for reading out a picture signal from a corresponding file in the RAM 13 or the disk 62 for transmitting the read out picture signal to the encoder 11. Then, an encoded and compressed picture signal is transmitted via the modem control unit 5, the modem 6 and the NCU 4. Then, at step 425, a check is made as to whether there is a transmission error or not in accordance with the control signal sent from the called facsimile apparatus. When there is a transmission error, a page on which the error has occurred is stored as an administration data at step 426. At step 427, where picture signals of all pages are correctly transmitted to a single destination without any transmission error, at step 427, already transmitted data are stored as the administration data.

Then, at step 428, a check is made as to whether an interruption was made due to the operation of the reset key of the operating unit. More particularly, in this embodiment, at the time of the multiple address communication, unless a transmission to destination terminates, interruption by the reset key is not permitted and a series of pages are continuously sent which is advantageous for supervising the copies on the receiving side.

Then, at step 429, a check is made as to whether all pages has been transmitted to all data destinations. When the result of check is NO, at step 430, a check is made as to whether a predetermined number of transmissions has been made to destinations to which transmission has not yet made. Where a predetermined number of transmissions have not yet been made, the program is returned to step 401 to continue the operation, whereas when the predetermined number of transmissions has been completed, at step 431, printing is performed based on the administration data. After that, at step 432, the picture signal of one page to be transmitted to a not yet transmitted destination is read out to perform printing. If printing of the picture image and printing of an administration data showing the not yet transmission on a single page, it is convenient for identifying first page not yet transmitted.

With this construction, where all picture signals accumulated in an accumulator are not transmitted, the operator can acknowledge this fact and know the content of the not yet sent manuscript. Furthermore, printing error can be accurately corrected, thus making it unnecessary any retransmission. After elimination of the printing errors, correct printing can be performed adequately after receipt of a predetermined input.

Respective administration data are administrated as a whole and can be outputted automatically in the form of a single table when a predetermined data is inputted by an operator at a predetermined time of day in accordance with a program.

As above described, according to this embodiment during the copying operation and while a picture signal is being inputted to disk 62, the calling is inhibited not only during the printing operation of the picture signal stored in the disk 62 but also at least in the definite interval $T_2$ subsequent thereto, thereby preventing "collision" of receiving and calling. This not only improves the efficiency of line utilization due to a decrease in recalling and in collision between transmission and receiving, but also increases the reliability and operativity of the apparatus.

Although in the foregoing description, nothing was mentioned about the input from the operating unit 23 regarding the destination telephone number data that starts the automatic dialing circuit 30, input setting of the telephone number data for the abbreviated dialing, the abbreviated data, a plurality of destination telephone number data in a multiple address communication group and the group number data can be made in the same manner as in the prior art facsimile apparatus. At the time of setting these data, the CPU 20 of the facsimile apparatus of this invention resets such mode designation states as the line density, and the manuscript size to a predetermined home position.

A calling according to a manual dial operation input from the operating unit 23 is the same as the prior art apparatus. A data set by a series of the operating inputs, for example, '03 666 1111' (telephone number data), '#' key input data of an input termination data is sequentially inputted to the automatic dialing circuit 30 through a buffer circuit for starting the circuit 30 thereby effecting a calling. Although in this embodiment, during the printing operation and the read out operation, a dial request is not detected, where the processing capability of the CPU 20 is increased, it becomes possible to detect the printing operation and the read out operation after a dial request has been detected, whereas when a picture signal from the read scanning unit 9 is inputted into disk 62 or during the copying operation, after elapse of timer time $T_2$, a picture signal stored in the disk 62 can be transmitted.

RAM 13 and disk 62 ensure accumulation of sufficient number of picture signals, thus enabling various functions. Moreover, as it is desirable to realize various functions for the transmission and receipt, by separating the area for storing transmitted picture signals and the area for storing received picture image signals (for example, one half each), it is possible to prevent received picture signals from occupying all areas thereby making it impossible to transmit. Furthermore, the CPU 20 supervises the idle area capacity of the memory devoce when a state occurs in which only areas less than a predetermined capacity are idle, the CPU 20 does not accept mail box communication, a relayed multiple address communication and the own office multiple address communication. Under this state, the operator is informed by lighting of the LED for taking adequate procedure.

When memory becomes a state in which less than a predetermined capacity are idle, the CPU does not accept a picture image signal of a dither intermediate tone to obtain the same effect as above.

In the foregoing description, the present invention has been described in connection with a facsimile apparatus. However, this invention is not limited in its application to facsimile apparatus only. It can be applied to any apparatus having a dial calling function.

What is claimed is:

1. A facsimile apparatus comprising:
storing means for storing received picture image information;
printing means for printing out picture image information;
trouble detecting means for detecting a trouble occurrence at the printing means; and
control means for causing, when the trouble detecting means detects a trouble occurrence at the printing means, the printing means to print out picture image information on the basis of the picture image information stored in the storing means, after the trouble occurrence is eliminated.

2. A facsimile apparatus comprising:
printing means for printing received picture image information;
trouble detecting means for detecting a trouble occurrence at the printing means;
storing means for storing, when the trouble detecting means detects a trouble occurrence at the printing means, picture image information received after the detection of the trouble occurrence; and
control means for causing the printing means to print out the picture image information received after the detection of the trouble occurrence on the basis of the picture image information stored in the storing means, after the trouble occurrence is eliminated.

3. A facsimile apparatus comprising:
storing means for temporarily storing received picture image information for a purpose of a relayed multiple address communication;
printing means for printing out picture image information;
trouble detecting means for detecting a trouble occurrence at the printing means;
means for inhibiting erasure of the picture image information temporarily stored in the storing means for the purpose of the relayed multiple address communication when the trouble detecting means detects a trouble occurrence at the printing means and when there is a request for printing out of the picture image information for the relayed multiple address communication; and
control means for causing, after the trouble occurrence is eliminated, the printing means to print out the picture image information associated with the trouble occurrence on the basis of the picture image information stored in the storing means.

4. A facsimile apparatus comprising:
accumulation means for accumulating picture image signals;
means for storing picture image signals received from an apparatus of a destination party in the accumulation means;
printing means;
preserving means for preserving picture image signals received by the accumulation means after a trouble occurrence is detected during printing of received picture image signals; and
preparation processing means for processing preserved picture image signals in preparation for printing them out after detected trouble occurrence is eliminated;
the printing means being operable to print out preserved picture image signals in response to predetermined data applied to the preparation processing means after the detected trouble occurrence is eliminated.

* * * * *